United States Patent [19]

Lee

[11] Patent Number: 5,309,473
[45] Date of Patent: May 3, 1994

[54] PULSED, FREQUENCY STABLE, NARROW LINEWIDTH MASTER OSCILLATOR AND PHASE CONJUGATION MIRROR THEREFOR WITH SEMICONDUCTOR MATERIAL HAVING BANDGAP FOR NONLINEAR RESONANCE

[75] Inventor: Kotik K. Lee, Colorado Springs, Colo.

[73] Assignee: Hughes Aircraft Company, Los Angeles, Calif.

[21] Appl. No.: 952,551

[22] Filed: Sep. 28, 1992

[51] Int. Cl.$^5$ .............................. H01S 3/08
[52] U.S. Cl. .................... 372/99; 372/108; 372/106; 372/25; 372/69; 372/21; 372/98
[58] Field of Search ........ 372/25, 26, 21, 98, 372/99, 108, 106, 69

[56] References Cited

U.S. PATENT DOCUMENTS

| | | | |
|---|---|---|---|
| 4,528,464 | 7/1985 | Chemla et al. | 359/326 |
| 4,757,268 | 7/1988 | Abrams et al. | 372/21 |

OTHER PUBLICATIONS

"Nonlinear Optical Phase Conjugation" by David M. Pepper, Optical Engineering, Mar./Apr. 1982 vol. 21 No. 2, pp. 156-183.

"Pulsed, Frequency Stable, Narrow Linewidth Master Oscillator", by K. K. Lee, Optics Communications Oct. 15, 1988, vol. 68, No. 4 pp. 271-276.

"Phase Conjugation by resonantly Enhanced Degenerate Four-Wave Mixing", by R. C. Lind, D. G. Steel and G. J. Dunning, Optical Engineering Mar./Apr. 1982 vol. 21 No. 2, pp. 190-198.

*Primary Examiner*—Léon Scott, Jr.
*Attorney, Agent, or Firm*—Michael W. Sales; Wanda K. Denson-Low

[57] ABSTRACT

A phase conjugation mirror (20) for use in a phase conjugation resonator (1). The phase conjugation mirror provides a nonlinear resonance enhancement for a coherent optical signal incident thereon. The phase conjugation mirror is comprised of a semiconductor material having a characteristic bandgap energy selected to be at an absorption bandgap edge, or slightly greater than the absorption bandgap edge, for the coherent optical signal.

18 Claims, 2 Drawing Sheets

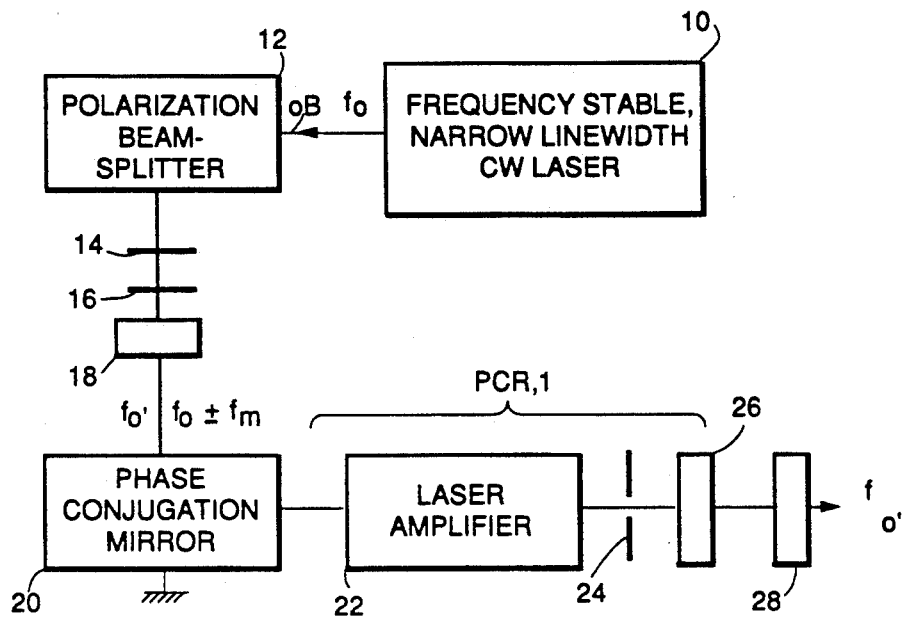
FIG. 1.
(PRIOR ART)
FIG. 2.
(PRIOR ART)
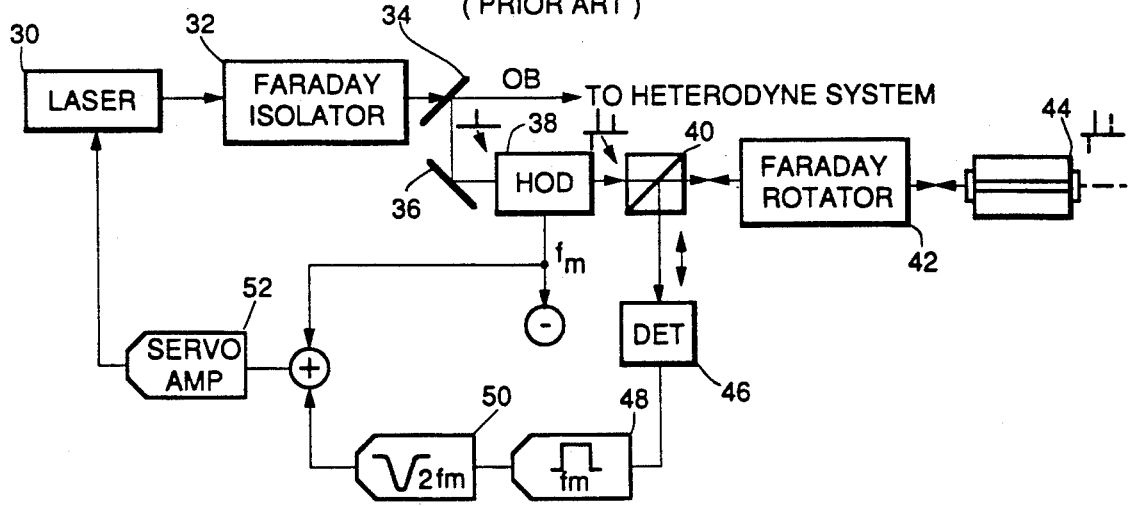

PULSED, FREQUENCY STABLE, NARROW LINEWIDTH MASTER OSCILLATOR AND PHASE CONJUGATION MIRROR THEREFOR WITH SEMICONDUCTOR MATERIAL HAVING BANDGAP FOR NONLINEAR RESONANCE

FIELD OF THE INVENTION

This invention relates generally to optical devices and, in particular, to a master oscillator employing a Phase Conjugation Mirror (PCM).

BACKGROUND OF THE INVENTION

A master oscillator may be employed for injection seeding or locking of power amplifiers and oscillators. Applications of such master oscillators include laser radar, laser communications, heterodyne detection, free electron lasers, nonlinear processes, and spectroscopy. Also, pulsed, frequency stable and narrow linewidth lasers are useful for the understanding of noise sources in nonlinear interactions.

A single mode, pulsed laser is often considered to be frequency stabilized. However, mode selection in a pulsed laser is not equivalent to frequency stabilization in that, with any type of mode selection method or device, a long term frequency drift may occur from pulse to pulse. This frequency drift is due to thermal or mechanical disturbances of the optical cavity length. Furthermore, short term frequency variations, or chirping, may occur within one pulse due to rapid refractive index variations of an active gain medium.

Phase conjugation resonators (PCR) have been recognized primarily for the spatial or mode properties of their output beam. Phase conjugation mirrors (PCM) using nearly degenerate four-wave mixing (NDFWM) have also been recognized for their capability of providing a narrow optical bandpass filter. Assuming an adiabatic approximation, pump nondepletion, and weak nonlinear coupling, it is found that as $|\kappa|L$ increases (here $\kappa$ is the complex coupling coefficient given by $\kappa = 2\pi f \chi^{(3)} I_p nc$; $I_p$ is the intensity of the pump, L is the nonlinear interaction length), the bandpass becomes more sharply peaked at the pumping frequency. When an oscillation condition is reached, (i.e., $|\kappa|L \sim \pi/2$) the bandpass approaches zero. The bandpass is then limited only by the linewidth of the pump. It has also been demonstrated that a pulsed laser displays automatic frequency locking using a saturable amplifier without cavity stabilization. Furthermore, frequency chirping is minimized for a PCR if the pulse duration is longer than the cavity round trip time, and the response time of the PCM is shorter than the inverse of the frequency chirping bandwidth of the gain medium.

In a journal article entitled "Pulsed, Frequency Stabile, Narrow Linewidth Master Oscillator" by K. K. Lee, Optics Communications, Vol. 68, No. 4, 15 October 1988 the inventor shows that a phase conjugation oscillator, with one PCM pumped by a frequency stabile, continuous wave (cw), narrow linewidth laser, together with an active amplitude modulation modelocker, can provide a frequency stable and narrow linewidth pulse whose properties are nearly identical to the cw pump. A technique is described for introducing frequency modulation. A phase conjugation mirror is described as being comprised of a photorefractive medium, such as $BaTiO_3$ and GaAs, having short diffusion and recombination times.

In a journal article entitled "Phase Conjugation by Resonantly Enhanced Degenerate Four-Wave Mixing" by R. C. Lind et al., Optical Engineering, March/April 1982, Vol. 21, No. 2, there is described the properties of resonantly enhanced degenerate four-wave mixing (DFWM). The effects of pump absorption and depletion, unequal pump fields, four-level behavior, and motional effects are described.

In a journal article entitled "Nonlinear Optical Phase Conjugation" by D. M. Pepper, optical Engineering, March/April 1982, Vol. 21, No. 2, there is described various aspects of nonlinear optical phase conjugation. In sections (V.1 and V.2) there is described the use of a semiconductor doped glass as a nonlinear medium and the use of a cw PCM ($BaTiO_3$) to compensate for modal dispersion. Table 1 is a summary of experiments where conjugate reflectivity was measured, the table classifying the PCM results in terms of optical wavelength employed. Of the number of nonlinear mediums listed in the Table, the use of HgCdTe with a $CO_2$ laser, and InSb with a CO laser, are shown.

An object of this invention is to provide a phase conjugation mirror that provides a maximum nonlinear resonant enhancement for a coherent optical signal incident thereon.

A further object of the invention is to provide a narrow linewidth, continuous wave master oscillator that includes a phase conjugation resonator having a phase conjugation mirror that provides a maximum nonlinear resonant enhancement for a coherent optical signal incident thereon.

SUMMARY OF THE INVENTION

The first object of the invention is realized by a phase conjugation mirror for use in a phase conjugation resonator. The phase conjugation mirror provides a nonlinear resonance enhancement for a coherent optical signal incident thereon. The phase conjugation mirror is comprised of a semiconductor material having a characteristic bandgap energy selected to be at an absorption bandgap edge, or slightly greater than the absorption bandgap edge, for the coherent optical signal.

The second object of the invention is realized by an optical system that includes a master oscillator for generating a narrow linewidth continous wave coherent optical signal. A frequency modulator has an input coupled to an output of the master oscillator for frequency modulating the coherent optical signal. The optical system further includes a phase conjugation resonator having an input coupled to an output of the frequency modulator, and also a phase conjugation mirror for providing a nonlinear resonance enhancement for the coherent optical signal. The phase conjugation mirror is comprised of a semiconductor material having a characteristic bandgap energy selected to be at an absorption bandgap edge, or greater than the absorption bandgap edge, for the coherent optical signal.

BRIEF DESCRIPTION OF THE DRAWING

The above set forth and other features of the invention are made more apparent in the ensuing Detailed Description of the Invention when read in conjunction with the attached Drawing, wherein:

FIG. 1 is a prior art block diagram illustrating a pulsed, frequency stable, narrow linewidth, frequency modulated master oscillator;

FIG. 2 is a prior art block diagram illustrating the use of a Pound-Drever technique for a cw frequency stable, narrow linewidth laser.

DETAILED DESCRIPTION OF THE INVENTION

Figure 3:
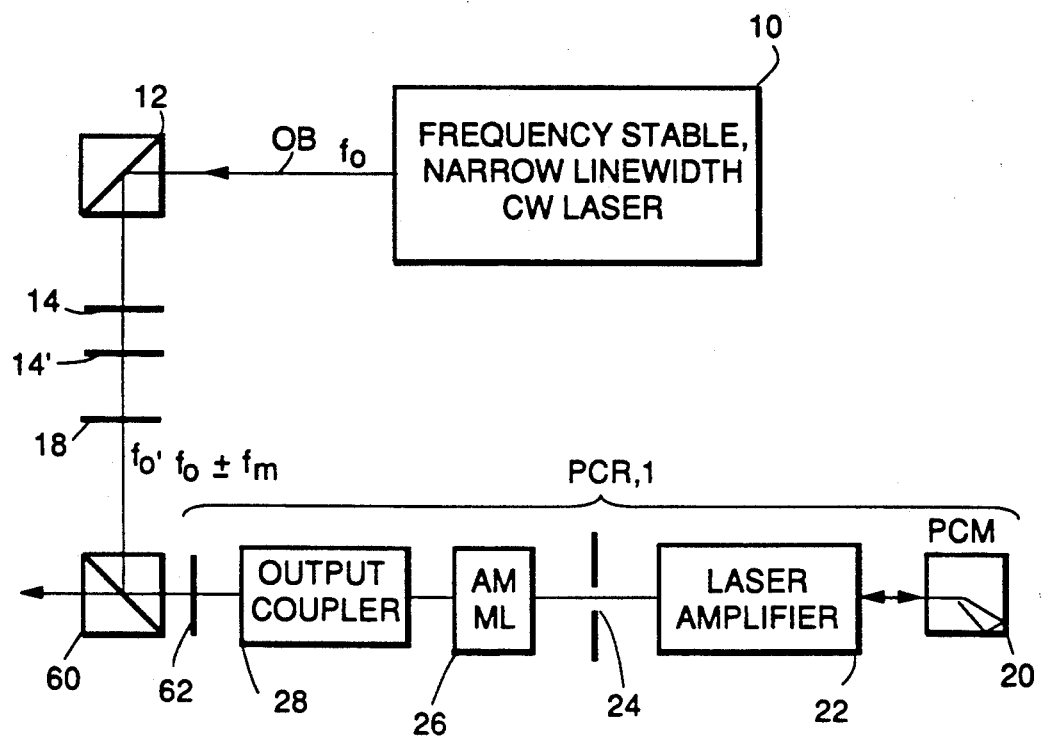
FIG. 3 is a prior art block diagram illustrating a self-pumped, pulsed, frequency stable, narrow linewidth master oscillator.

The following discussion of FIGS. 1-3 is based on the above noted prior at Lee reference.

FIG. 1 is a block diagram illustrating a pulsed, frequency stable, narrow linewidth, frequency modulated master oscillator. A cw laser 10 generates an output beam (OB) of frequency $f_o$. OB is applied to a polarizing beamsplitter 12 which directs a portion of the beam to a Faraday rotator 14, or alternatively to a quarter-wave plate. The output of the rotator 14 is applied to a polarizer 16 and to a frequency modulator (FM) 18. The output of FM modulator 18 includes the fundamental frequency $f_o$ and a modulation frequency $(f_o \pm f_m)$.

The frequency modulated signal pumps a four-wave mixer of a phase conjugation resonator (PCR) 1. That is, the modulated laser signal is applied to a phase conjugation mirror (PCM) 20, the output of which is directed through a laser amplifier 22, a pin hole 24, an amplitude (AM) mode-locker 26, and through a suitable output coupler 28.

If a frequency stable, narrow linewidth, cw pump laser has a central frequency of $f_o$, a linewidth of $\Delta f$, and if the PCR has a cavity length of L, then the cavity mode spacing is $\Delta f_c = c/4L$, half of the spacing of a typical oscillator. Letting the modulation frequency be $f_m$, and assuming that $\Delta f << f_m < f_c << f_o$, it can be shown that as the nonlinear gain increases for a four-wave mixing PCM 20, the bandpass becomes more sharply peaked, with the zeros of the response occurring at decreasing values to the frequency offset. When the oscillation condition is approached, the bandpass is limited only by the linewidth of the pump, which is $f_m + \Delta f$.

FIG. 2 is a block diagram illustrating one suitable technique for frequency modulating the laser output. Specifically, FIG. 2 shows the use of a Pound-Drever technique for FM-modulating a cw, frequency stable, narrow linewidth laser.

A laser 30 provides an output to a Faraday isolator 32. A portion of the output beam (OB) is diverted by a beamsplitter 34 to a mirror 36. This signal is applied to a phase modulator 38. Phase modulator 38 may be comprised of ADP, and has an electrode coupled to a frequency modulating (fm) signal. The output of the phase modulator 38 is applied to a beamsplitter 40. One output of beamsplitter 40 is applied through a Faraday Rotator 42, or a quarter-wave plate, to a reference cavity resonator 44. The reference cavity 44 output is directed back through the rotator 42 and is diverted by the beamsplitter 40 to a detector 46. The detector 46 generates an electrical signal that is applied to an input of an amplifier 48 that is selected to have a bandpass characteristic that includes the frequency excursions of the FM signal. The output of the bandpass amplifier 48 is applied to a notch filter 50, the output of which multiplied by the fm signal and applied to a servo amplifier 52. Servo amplifier 52 drives the laser 30 so as to cause the laser 30 to frequency modulate OB in accordance with the fm electrical signal. As an example, for a communications system the fm electrical signal is expressive of the information to be modulated onto and transmitted by the OB.

Referring again to FIG. 1, if the PCM material is so chosen that at $f_o$ the oscillation condition is met, then the modulation bandwidth is also very near the oscillation condition in that the typical electro-optical modulation frequency $f_m$ extends to only a few GHz. However, it is known that such a modulation bandwidth is sufficient for short pulse generation in many applications. Thus, the circulating optical frequency and bandwidth in the PCR 1 are the same as that of the pump waves which drive the PCM 20, and the frequency and its modulated bandwidth are most likely to oscillate because of the enhanced reflectivity of the PCM 20. Indeed, at or near the resonance condition, the enhanced reflectivity of the four-wave mixing PCM 20, at the pump bandwidth, is typically several orders of magnitude larger than the reflectivity of the four-wave mixer at other frequencies in the laser gain bandwidth. As a result, the PCR 1 will oscillate only at the pump frequency.

For most practical applications for laser radar, laser communication, nonlinear processes,, etc., a laser linewidth of 1 KHz, or $\Delta v/v \sim 10^{-11}$, is sufficient. As an example, assume that a cw, frequency stable, narrow linewidth laser of linewidth about 1 KHz is to pump the PCR 1. If the effectively cavity length L of the PCR 1 is 10 cm, then the oscillator mode spacing $(V_{osc})$ is $c/4L = 0.75 \times 10^9$ Hz. If the material of the PCM 20 is so chosen such that the gain is resonantly enhanced, then the PCR 1 fairly preserves the narrow linewidth of the pump, and the gain bandwidth of the PCR 1 is only 1 KHz instead of the gain bandwidth of the laser medium, which may be as large as $10^{12}$ Hz.

It is known that the self-consistent mode-locked pulse in a homogeneously broadened laser is:

$$t_p = (2ln2)^{\frac{1}{4}}(2g_o/\delta_1^2)^{\frac{1}{4}}(1/\Delta v_{osc}\Delta v_{gain})^{\frac{1}{2}},$$

where $g_o$ is the saturated single pass gain of the laser medium, and $\delta_1$ is a modulation retardation factor. Typically, the factor $(2g_o/\delta_1^2)$ is of the order of unity. Moreover, it is only one fourth the power of the gain, which is relatively insensitive to frequency variations up to a few GHz. Thus $$t_p \sim 0.66(1/\Delta v_{osc}\Delta v_{gain})^{\frac{1}{2}} = 7.6 \times 10^{-7}s,$$

where $\Delta v_{osc} = 0.75$ GHz and $\Delta v_{gain} = 1$ KHz. It is clear that such a pulsewidth is too long for some applications. It is also clear that in order to shorten the pulsewidth, it is necessary to broaden the gain bandwidth. Of course, the cw pump linewidth can be broadened, but at the cost of reducing the spectral resolution. In order to preserve the laser linewidth, and thus the spectral resolution, while broadening the gain bandwidth so as to shorten the pulsewidth, a frequency modulation technique can be employed to the narrow linewidth cw pump. This is because the FM of the pump is known, and can be demodulated not to reduce the spectral resolution, yet the controlled frequency modulation broadens the effective gain bandwidth of the PCR 1.

For example, if the FM bandwidth is 1 GHz, still much smaller than laser medium gain bandwidth, then the pulsewidth of the PCR 1 can be shortened substantially, i.e., $t_p = 7.6 \times 10^{-10}s$. It should be noted that here the modulation frequency $f_m = 1$ GHz, which is greater than the cavity mode spacing of approximately 0.75

GHz. In a conventional resonator with injection locking, mode hopping is likely to occur. Nonetheless, due to the frequency stable cw pump and the lack of intrinsic resonance frequency of the PCR 1, the oscillation line center remains fixed and mode hopping is avoided. The modulation frequency can be increased further if so desired. Thus, for some laser media subnanosecond, frequency stable, narrow linewidth pulses can be obtained. Furthermore, in that the resonance frequency of the PCR 1 is independent of the cavity length, a shorter PCR cavity can be employed to shorten the pulse further.

FIG. 3 is a block diagram illustrating an embodiment of a self-pumped, pulsed, frequency stable, narrow linewidth master oscillator. In FIG. 3 components that are numbered as in FIGS. 1 and 2 have equivalent functions. The frequency stable, narrow linewidth cw laser 10 provides the output beam to a polarized beam splitter 12. Polarized beam splitter 12 directs a portion of the output beam to a first Faraday rotator 14, a second Faraday rotator 141 and the frequency modulator 18. The frequency modulated narrow linewidth optical signal is then applied to the PCR 1. In this embodiment the PCR 1 is configured as follows. A polarizing beam splitter 60 directs a portion of the FM beam to a Faraday rotator 62, an output coupler 28, the AM mode locker 26, the pin hole aperture 24, the laser amplifier 22 and the PCM 20. The frequency modulated signal experiences a resonant enhancement at the PCM 20 and is directed back through the aforementioned components, including the polarizing beam splitter 60. Due to the resonant enhancement induced by the PCM 20, the narrow linewidth of the optical signal is preserved.

DISCUSSION OF IMPROVEMENT

Having thus described the operation of the master oscillator, the PCRI, and a suitable FM, there are now described a plurality of materials for fabricating the PCM 20.

In accordance with the invention, the material or materials are selected to have an energy bandgap that is greater than an energy of the incident radiation, so as to be substantially non-absorbing, while yet being near to the absorption edge so as to maximize resonant enhancement.

Four-wave mixing materials suitable for this application include, for a master oscillator that includes a Nd:Host laser, a strained super-lattice having a bandgap slightly higher than the photon energy so as to achieve a resonance enhanced nonlinearity. For master oscillators that include (a) GaAs/AlGaAs diode lasers, (b) Ti:Al$_2$O$_3$ tunable solid-state lasers, or (c) longer wavelength InP/InGaAsP diode lasers, the following materials are suitable.

For the first two laser types (a) and (b), GaAs/AlGaAs heterojunction or multiple quantum wells are suitable, while for the latter laser type (c) a InP/InGaAsP heterojunction or multiple quantum wells, having a bandgap slightly higher than the photon energies, are employed to achieve a resonance enhanced nonlinearity. For CO$_2$ lasers, a Group ii-vi alloy material such as mercury-cadmium-telluride (HgCdTe), having a bandgap slightly higher than the photon energy, is employed to achieve the enhanced nonlinearity.

In all cases, the angle of incidence of the radiation is preferably shallow so as avoid total internal reflection. The selected semiconductor material is preferably applied as a thin film, having a thickness of approximately one micrometer, to a surface of a suitably shaped substrate. Furthermore, the bandgap of the selected semiconductor material is adjusted so as to be at or near the absorption band edge.

While the invention has been particularly shown and described with respect to preferred embodiments thereof, it will be understood by those skilled in the art that changes in form and details may be made therein without departing from the scope and spirit of the invention.

What is claimed is:

1. An improved phase conjugation mirror for use in a phase conjugation resonator, the improvement comprising said phase conjugation mirror being comprised of a semiconductor material having a characteristic bandgap energy near and at least as great as the absorption bandgap edge for the coherent optical signal whereby a nonlinear resonance enhancement for a coherent optical signal incident thereon is provided.

2. A phase conjugation mirror as set forth in claim 1 wherein the coherent optical signal is generated b an Nd:Host laser, and wherein the semiconductor material is provided as a strained super-lattice having a bandgap that is greater than a photon energy of the coherent optical signal so as to provide a resonance enhanced nonlinearity.

3. An improved phase conjugation mirror as set forth in claim 1 wherein the coherent signal is generated by a GaAs/AlGaAs diode laser, and wherein the semiconductor material is comprised of GaAs/AlGaAs provided as a heterojunction.

4. A phase conjugation mirror as set forth in claim 1 wherein the coherent optical signal is generated by a Ti:Al$_2$O$_3$ solid-state laser, and wherein the semiconductor material is comprised of GaAs/AlGaAs provided as a heterojunction or as multiple quantum wells.

5. A phase conjugation mirror as set forth in claim 1 wherein the coherent optical signal is generated by a InP/InGaAsP diode laser, and wherein the semiconductor material is comprised of InP/InGaAsP provided as a heterojunction or as multiple quantum wells.

6. A phase conjugation mirror as set forth in claim 1 wherein the coherent optical signal is generated by a CO$_2$ laser, and wherein the semiconductor material is comprised of a Group II-VI alloy material.

7. A phase conjugation mirror as set forth in claim 6 wherein the Group II-VI alloy material is comprised of mercury-cadmium-telluride (HgCdTe).

8. An improved phase conjugation mirror as set forth in claim 1 wherein the coherent optical signal is generated by a GaAs/AlGaAs diode laser, and wherein the semiconductor material is comprised of GaAs/AlGaAs provided as multiple quantum wells.

9. An improved optical system, said system of the type having
   master oscillator means for generating a narrow line continuous wave coherent optical signal;
   means, having an input coupled to an output of said master oscillator means, for frequency modulating said coherent optical signal; and
   a phase conjugation resonator having an input coupled to an output of said frequency modulating means, said phase conjugation resonator including a phase conjugation mirror, the improvement comprising:
   said phase conjugation mirror comprised of a semiconductor material having a characteristic bandgap energy near and at least as great as the absorption bandgap edge for the coherent optical signal whereby a nonlinear resonance enhancement for a coherent optical signal incident thereon is provided.

10. An optical system as set forth in claim 9 wherein the master oscillator means includes an Nd:Host laser, and wherein the semiconductor material is provided as a strained super-lattice having a bandgap that is greater than a photon energy of the coherent optical signal so as to provide a resonance enhanced nonlinearity.

11. An improved optical system as set forth in claim 9 wherein the master oscillator means includes a GaAs/AlGaAs diode laser, and wherein the semiconductor material is comprised of GaAs/AlGaAs provided as a heterojunction.

12. An improved optical system as set forth in claim 9 wherein the master oscillator means includes a Ti:Al$_2$O$_3$ solid-state laser, and wherein the semiconductor material is comprised of GaAs/AlGaAs provided as a heterojunction.

13. An improved optical system as set forth in claim 9 wherein the master oscillator means includes a InP/InGaAsP diode laser, and wherein the semiconductor material is comprised of InP/InGaAsP provided as a heterojunction.

14. An optical system as set forth in claim 9 wherein the master oscillator means includes a CO$_2$ laser, and wherein the semiconductor material is comprised of a Group II-VI alloy material.

15. An optical system as set forth in claim 14 wherein the Group II-VI alloy material is comprised of mercury-cadmium-telluride (HgCdTe).

16. An improved optical system as set forth in claim 9 wherein the master oscillator means includes a GaAs/AlGaAs diode laser, and wherein the semiconductor material is comprised of GaAs/AlGaAs provided as multiple quantum wells.

17. An improved optical system as set forth in claim 9 wherein the master oscillator means includes a Ti:Al$_2$O$_3$ solid-state laser, and wherein the semiconductor material is comprised of GaAs/AlGaAs provided as multiple quantum wells.

18. An improved optical system as set forth in claim 9 wherein the master oscillator means includes an InP/InGaAsP diode laser, and wherein the semiconductor material is comprised of InP/InGaAsP provided as multiple quantum wells.

* * * * *